May 25, 1965  G. H. ALLARD  3,185,132
AUTOMATIC RELEASE MECHANISM FOR MILKING APPARATUS
Filed Nov. 5, 1962  2 Sheets-Sheet 1

INVENTOR.
GORDON H. ALLARD
BY Andrus & Starke
ATTORNEYS

May 25, 1965 G. H. ALLARD 3,185,132
AUTOMATIC RELEASE MECHANISM FOR MILKING APPARATUS
Filed Nov. 5, 1962 2 Sheets-Sheet 2
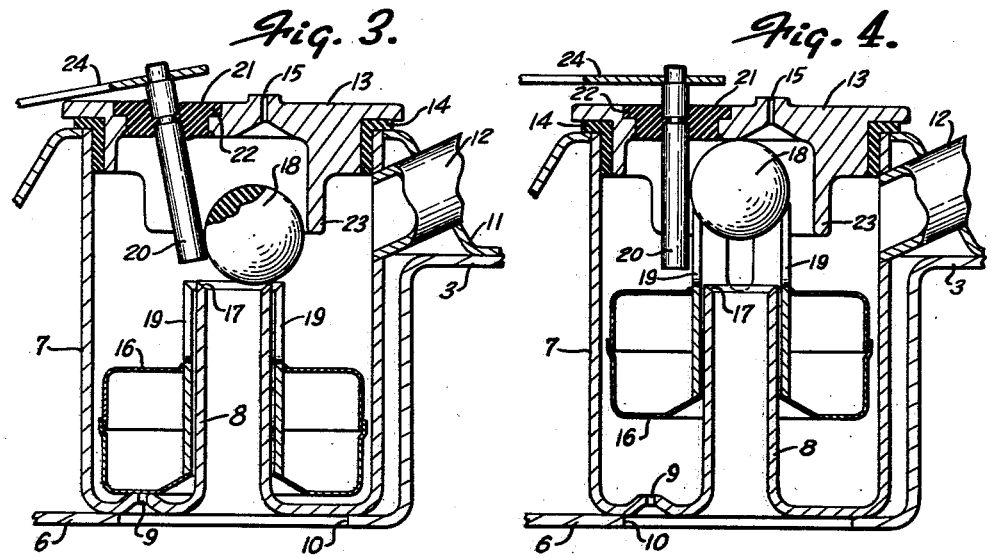
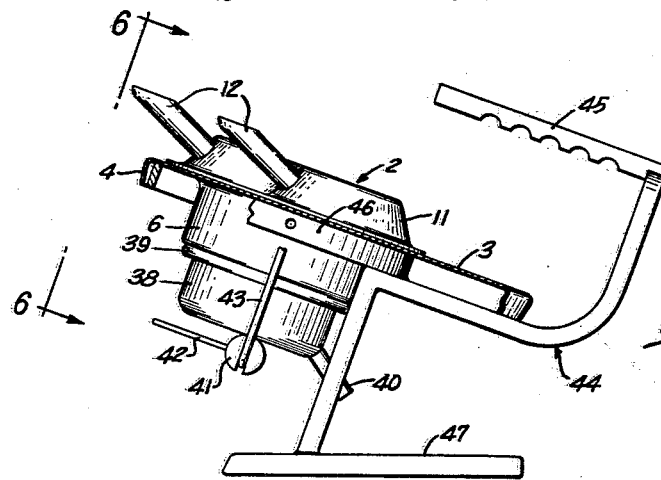
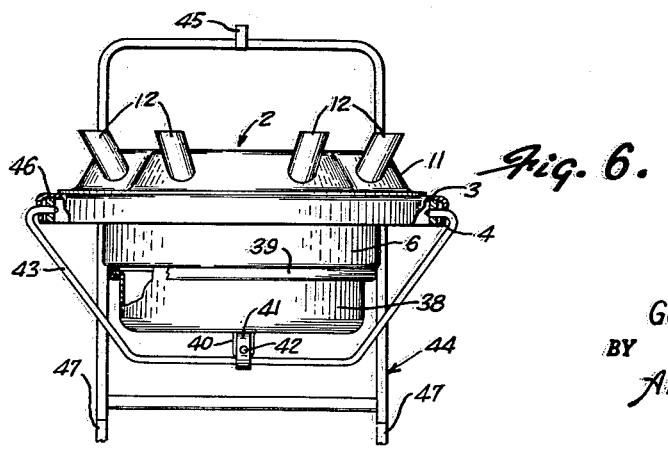
INVENTOR.
GORDON H. ALLARD
BY
Andrus & Starke
ATTORNEYS

3,185,132
AUTOMATIC RELEASE MECHANISM FOR MILKING APPARATUS
Gordon H. Allard, Milwaukee, Wis., assignor, by mesne assignments, to Sta-Rite Products, Inc., Delavan, Wis., a corporation of Wisconsin
Filed Nov. 5, 1962, Ser. No. 235,276
14 Claims. (Cl. 119—14.08)

This invention relates to a milking apparatus and more particularly to a milking apparatus having an automatic release device for breaking the vacuum applied to an animal's teats after the flow of milk ceases.

An automatic release device for a milker is employed to break the vacuum applied to a cow's teats after the flow of milk has ceased in order to prevent injury to the cow. The conventional automatic shutoff device includes four cups or receptacles, each of which has a milk inlet nipple which is connected to a teat cup. Each of the cups is provided with a milk outlet spaced above the bottom of the cup which communicates with a bucket or bowl, and each outlet is adapted to be closed off by a valve member carried by a float.

In order to initialy establish the vacuum to the teat cups and start the flow of milk, a lifting mechanism is employed to lift the valve members from the outlet tubes. Once the milk is flowing into the cups, the floats will rise and engage the valves to thereby maintain the valves in the open position. When the flow of milk ceases, the floats will lower thereby causing the valve members to close off the outlet tubes and break the vacuum to the teat cups.

The conventional automatic shutoff device includes an operating mechanism for lifting the valve members which is normally located within the bucket or bowl in the milk zone. These devices are composed of a substantial number of moving parts and require cleaning after each milking operation. Because of the location and number of components involved, it is often difficult to maintain the operating mechanism in the required degree of cleanliness required by sanitary codes.

The present invention is directed to a milking apparatus including an automatic shutoff device in which the valve members are initially open to establish the vacuum to the teat cups by a mechanism located externally of the cups and buckets.

More specifically, each valve member is in the form of a ball or sphere which is seated on the upper end of the outlet tube in the cup. To initially establish the vacuum to the teat cups, the balls are moved or displaced from the valve seat by an actuating pin which extends through a flexible, resilient plug secured within an opening in the cover of the cup.

The upper end of the pin is connected to an actuating mechanism which is mounted on the lid. The actuating mechanism is moved by the operator to pivot the pin within the flexible plug and bring the lower end of the pin into engagement with the ball to move the ball from the valve seat and establish the vacuum.

As an additional feature, the lid which carries the cups or receptacles is provided with substantially smooth upper and lower surfaces which facilitates cleaning of the lid. The lid includes a lower plate which is provided with a well, and the cups are seated within the well. The well provides a smooth continuous lower surface for the lid and eliminates the problem of cleaning between individual cups which is necessary in the conventional device. In addition, the lid is provided with an upper plate which is secured between the upper surface of the lower plate and the upper edges of the cups to provide a smooth sloping upper surface for the lid.

This double wall construction using the upper and lower plates enables the milk inlet nipples to be brazed or secured to both the cup wall and the upper plate, thereby insuring a stronger attachment to the lid and preventing breakage of the nipples if they are accidentally kicked by the cow.

The present invention provides a device in which the operating mechanism for initially lifting the valve members from the outlet tubes is located outside of the milk zone. This substantially simplifies the cleaning of the apparatus and ensures a more sanitary milking operation. Moreover, the lid assembly is provided with smooth upper and lower surfaces which also facilitates cleaning and eliminates recessed areas which are difficult to properly clean.

The use of the flexible resilient plug, through which the actuating pin extends, provides a pivotal connection for the pin and yet ensures a tight, sealed connection so that there will be no loss of vacuum during pivotal movement of the pin. The flexible plug merely flexes or deforms under the pivotal movements so that the seal between the pin and the plug and between the plug and the lid, is maintained at all times during the operation.

Other objects and advantages will appear in the course of the following description.

The drawing illustrates the best mode presently contemplated of carrying out the invention.

In the drawings:

FIG. 3 is a view similar to FIG. 2 showing the position of the ball valve after being unseated by the actuating pin;

FIG. 4 is a view similar to FIG. 3 showing the ball valve in the open position and being held in the open position by the float;

FIG. 5 is a side elevation of a modified form of the invention in which the lid assembly is used with a bowl in a pipeline milking system; and FIG. 6 is a view taken along line 6—6 of FIG. 5.

Figure 1:
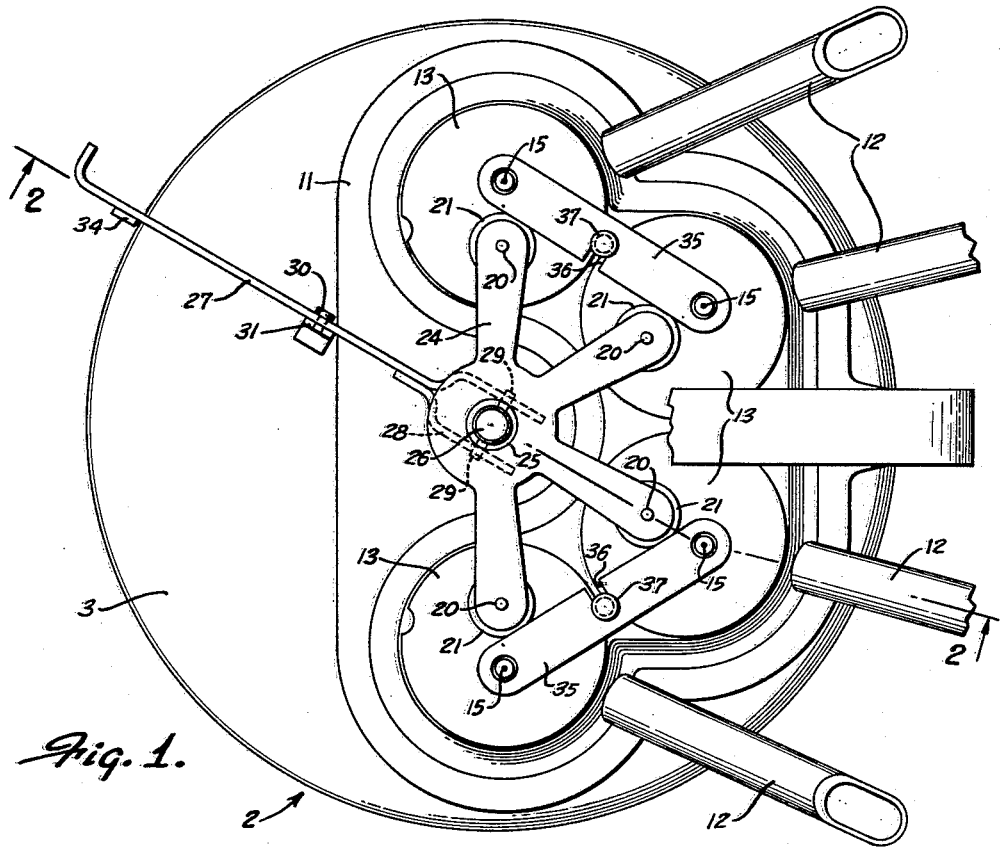
FIG. 1 is a plan view of the lid assembly incorporating the milk shutoff apparatus of the invention.

The drawings illustrate a milking apparatus having an automatic shutoff device which serves to automatically break the vacuum to the teat cups after the flow of milk has ceased in order to prevent injury to the cow's teats.

The structure includes a bucket 1 having an open top which is enclosed by a lid 2. The bucket 1, as shown, is a self-containing bucket in which the milk is collected. However, it is contemplated that a smaller bowl may be employed in place of the bucket 1, and the bowl may have a discharge outlet through which the milk is discharged to a bulk storage tank, as in a pipeline milking system.

The lid 2 comprises a lower lid plate 3 having a downwardly extending flange 4 which is located around the neck of the bucket 1 and is sealed to the neck by a gasket 5.

The central portion of the lid plate 4 is provided with a depression or well 6 and four cups or receptacles 7 are mounted within the well. Each cup is provided with a central vertical outlet tube 8 and the lower surface of each cup is also provided with a drain hole 9. The well 6 of the plate 4 is provided with a series of openings 10 and the lower end of the outlet tube 8 and the drain hole 9 of each cup are in alignment with the respective openings 10 so that the outlet tube and drain hole communicate with the bucket 1.

In addition to the lower lid plate 3, the lid also includes an upper plate 11 which is secured to the plate 3 and to the upper edges of the cups 7. The plate 11 slopes downwardly from the upper edges of the cups 7 providing a smooth upper surface for the lid and eliminating the recessed areas between the cups which are normally present in a conventional milking device of this type. Similarly, the well 6 provides a smooth contour for the lower surface of the lid, and similarly eliminates the recesses between the cups which are normally present in the conventional device.

Figure 2:
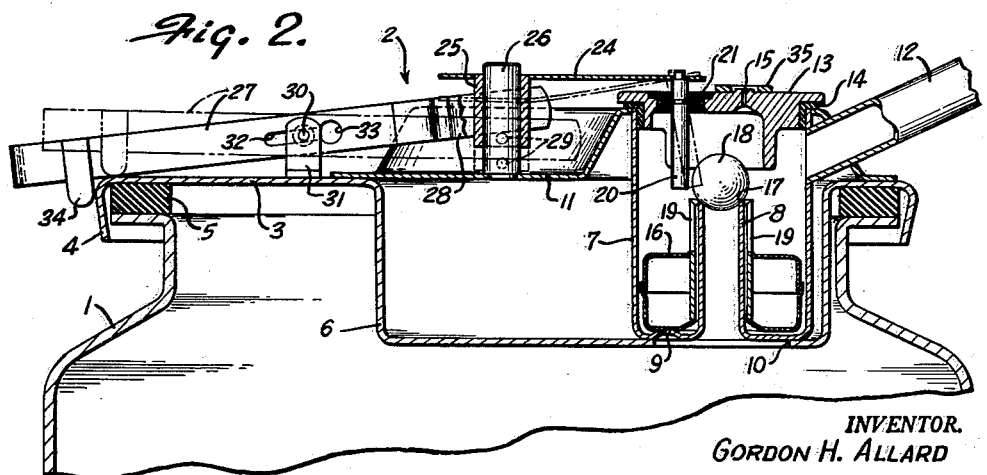
FIG. 2 is a vertical section taken along line 2—2 of FIG. 1 and showing the float and valve in the closed position before milk flows into the cup.

A milk inlet nipple 12 is brazed or otherwise secured in an opening in the upper portion of each cup 7. Each nipple 12 is adapted to be connected to a hose leading to a teat cup. As best shown in FIG. 2, the nipple 12 is also brazed or secured to the upper plate 11 and the spaced connections of the nipple to the cup 7 and plate 11 provide a firmer and stronger attachment of the nipples to the lid.

The top of each cup 7 is enclosed by a cover 13 and the cover is sealed to the wall of the cup by an annular seal 14. The covers 13 are generally made of a transparent plastic material and each cover 13 is provided with a small vent hole 15.

An annular float 16 is disposed around the central outlet tube 8 in each cup and is adapted to rise and fall with the level of milk in the cups. The upper end of tube 8 defines a valve seat 17 which is adapted to be closed off by a ball valve 18. The ball valve 18 is generally composed of a lightweight material such as plastic or the like. The float 16 is also provided with a series of spaced prongs 19 which extend upwardly from the float and are located around the outlet tube 8. As the float 16 rises, the prongs 19 engage the ball valve 18 and hold the valve in the open position. Milk in the cup then flows between the prongs 19 and into the outlet tube 8.

To lift the ball valves 18 from the respective seats 17 at the beginning of the milking operation and thereby establish a vacuum through the cups 7 to the teat cups, a pin 20 extends through, and is sealed within, an opening in a resilient flexible plug 21, which is sealed within an opening in the cover 13 by a suitable adhesive. The plug 21 is provided with an outwardly extending flange 22 which is secured against a shoulder formed in the cover 13.

The lower end of the pin 20 is spaced slightly out of contact with the ball 18 when the ball is seated on the valve seat 17. The lower end of the pin 20 is also located slightly below the center of the ball so that when the pin is moved into engagement with the ball, the pin will tend to raise the ball off of the valve seat 17.

To prevent the complete displacement of the ball 18 from the seat 17 and insure the return of the ball to the seat when the pin 20 is returned to the vertical position, the cover 13 is provided with a skirt or wall 23 which is disposed radially outward of the axis of the cup 7. As best shown in FIG. 3, the radius A of the ball is greater than the distance B between the outer edge of the tube 8 and the inner surface of the wall 23 so that the ball will fall by gravity to its seated position on valve seat 17.

The pins 20 are pivoted within the resilient plugs 21 to move the ball valves 18 from the valve seats 17 by an operating mechanism which is located on the upper surface of the lid 2. The operating mechanism includes a flexible spider 24 made of spring steel or the like and the arms of the spider are connected to the upper ends of the pins 20. A sleeve 25 is secured within a central opening in the spider and is slidably mounted on the central post 26, mounted on the lid 2.

The sleeve 25 is moved vertically on the post 26 to flex the arms of the spider 24 and thereby pivot the pins 20 by a handle 27. The handle 27 includes a yoke 28 which straddles the sleeve 25 and rests on pins 29 secured to opposite sides of the sleeve. The central portion of the handle is connected by pin 30 to a bracket 31 secured to lid 2 and the pin 30 is slidable within a slot 32 formed in the handle. One end of the slot is provided with an enlargement 33 which has a larger diameter than the head of the pin 30 so that the handle can be disassembled from the bracket 31 for cleaning purposes.

As best shown in FIG. 2, the normal position of the handle 27 and spider 24 is shown in the solid lines. When it is desired to establish a vacuum to the teat cups, the handle 27 is moved forwardly, as shown by the dashed lines, with the result that the arms of the spider 24 are flexed and the pins 20 are pivoted within the resilient plugs 21 to engage the ball valves 18 and displace them from the valve seats 17. To lock the handle 27 in this position, a locking bar 34 is secured to the outer end of the handle and is adapted to rest on the upper surface of the lid plate 3 to maintain the handle in the automatic or vacuum establishing position. After the vacuum has been established, the handle can be drawn outwardly to the position shown in full lines, in which case the locking bar 34 will drop downwardly along the flange 4 on the lid.

The covers 13 for the cups 7 are maintained in place by a pair of holddown bars 35 which engage the upper surfaces of the covers. The holddown bars 35 are provided with slots 36 which are engaged with pins 37 on the lid and serve to maintain the holddown bars in proper position.

In operation of the apparatus, the teat cups are initially applied to the cow's teats and a suitable vacuum line, not shown, is connected to the bucket 1 to draw a vacuum therein. The operating handle 27 at this time is in the position shown by the full lines in FIG. 2 and the lifting pins 20 are in vertical position out of contact with ball valves 18 which are seated on the valve seats 17.

To establish the vacuum from the bucket 1 to the teat cups, the handle 27 is moved forwardly with the result that the arms of the spider 24 are flexed downwardly as shown by the dashed lines in FIG. 2 thereby pivoting the lifting pins 20 within the resilient plugs, as shown in FIG. 3, and moving the ball valves 18 off of the valve seats 17. This establishes a vacuum to the teat cups through the nipples 12. After the milk has begun to flow into the cups 7, the floats 16 will rise until the projections on prongs 19 on the float engage the ball valves 18 and maintain the ball valves in the open position, as shown in FIG. 4. The milk within the cup will overflow through the passages between the prongs 19 into the outlet tubes 8 and then into the bucket 1.

At this time the operator may return the handle 27 to the original position and the pins 20 will thereby be moved back to their original vertical position.

After the milking operation has been completed and the milk ceases to flow, the milk within the cup will flow from the cups through the drain outlets 9 and the float will thereby be lowered until the ball valves 18 seat on the valve seats 17 to thereby cut off the vacuum through the cups 7 to the teat cups. With the vacuum removed, the atmospheric pressure is restored to the cups 7 through vents 15. The teat cup will then fall from the cow's teat or will be readily removed so that injury to the cow is prevented.

With the present invention, all of the operating mechanism for lifting the valves 18 to establish the vacuum is contained on the outside of the cups and bucket in a location out of the milk zone. This substantially simplifies the cleaning operation and produces a more sanitary milk supply.

Furthermore, the cleaning of the apparatus is simplified in that the lid is provided with smooth, upper and lower surfaces which eliminates recessed areas which are difficult to properly clean.

The flexible, resilient plug 21 through which the actuating pin 20 extends, provides a pivotal connection for the pin, yet insures a tight sealed connection so that there will be no loss of vacuum during pivotal movement of the pin.

A modified form of the invention is shown in FIGS. 5 and 6. In this embodiment, the lid 2 and the valve actuating structure, including the ball valves 18, and the pins 20 are identical to that shown in the first embodiment. However, in the structure shown in FIGS. 5 and 6, a small pan or bowl 38 is employed in place of the bucket 1. In this construction, the bowl 38 is disposed against the lower surface of the well 6 and a suitable gasket or seal 39 is located between the surfaces to seal the same. The bowl 38 is provided with an outlet tube 40 which is connected to a pipe line or other source of vacuum.

The bowl is held upwardly against the well 6 by an eccentric member 41 which is rotated by a lever 42 secured to the member. The peripheral edge of the eccentric member 41 is provided with a groove which receives a bail 43 and the ends of the bail extend through openings in the flange 4 of lid 2. With this construction, as the lever is turned, the eccentric 41 will rotate to firmly push the bowl 38 into engagement with the lower surface of the well 6.

As the structure shown in FIGS. 5 and 6 is adapted to be suspended from the cow, a support 44 is attached to the lid and includes a bar 45 which is adapted to be supported from a surcingle or belt attached to the cow. The support 44 is provided with a ring 46 which fits within the flange 4 of the lid 2 and the ends of the bail 43 extend through openings in the ring 46 as well as through openings in the flange. In order that the unit may be supported during periods of non-milking, the support 44 is provided with feet 47 which rest on the ground or other supporting surface.

Various modes of carrying out the invention are contemplated as being within the scope of the following claims particularly pointing out and distinctly claiming the subject matter which is regarded as the invention.

I claim:

1. In an automatic shut-off apparatus for a milking system, a closed cup having an inlet opening connected to an animal's teat and having an outlet opening spaced above the bottom of the cup and connected to a source of vacuum, a valve to open and close the outlet opening, a resilient plug secured in sealed relation within an aperture in a wall of the cup, an actuating member extending through the plug and sealed thereto, the inner end of said actuating member being disposed in spaced relation to the valve and adapted to selectively engage the valve and open the outlet opening, and operating means located on the exterior of the cup and operably connected to the outer end of said actuating member for moving the actuating member and opening said valve.

2. In an automatic shut-off apparatus for a milking system, a closed cup including a top wall and having an inlet opening connected to an animal's teat and having an outlet opening spaced above the bottom wall of the cup and connected to a source of vacuum, a valve to open and close the outlet opening, a resilient member hermetically sealed within an aperture in the top wall of the cup, an actuating member extending through said resilient member and bonded thereto with the inner end of said actuating member being normally located laterally of said valve, and operating means operably connected to the upper end of said actuating member for moving the lower end of the actuating member into contact with the valve to displace the valve from the outlet opening and establishing a vacuum through the cup to the animal's teat to start the flow of milk.

3. In a milking apparatus defining a series of closed chambers with each chamber having an inlet adapted to be connected to an animal's teat, a tubular outlet disposed generally centrally of each chamber and connected to a source of vacuum, an annular float disposed around the tubular outlet in said chamber, a spherical valve disposed to seat on the upper end of said tubular outlet and adapted to open and close said tubular outlet, a resilient member hermetically sealed within a wall of said chamber, an actuating member extending through said resilient member and bonded thereto with the inner end of said actuating member being located laterally of said valve and out of contact therewith, and operating means disposed on the exterior of the cup and connected to the outer end of said actuating member for pivoting the inner end of said actuating member into contact with the valve to displace the valve from the tubular outlet and establish a vacuum through the chamber to start the flow of milk.

4. The structure of claim 3, in which the actuating member is normally vertical and the lower end of the actuating member extends beneath the horizontal center line of said spherical valve.

5. The structure of claim 3 and including stop means disposed within the chamber and located laterally outward and in spaced relation to said spherical valve for preventing complete displacement of said valve from the tubular outlet.

6. In a milking apparatus, a cup including a generally cylindrical wall and having an inlet adapted to be connected to an animal's teat, a cover for said cup, a tubular outlet disposed centrally of the cup and connected to a source of vacuum, an annular float disposed around the tubular outlet in said cup, a ball valve disposed to open and close the tubular outlet, an actuating member extending through an opening in said cover with the lower end of the actuating member being normally located laterally of and out of contact with said ball valve, a skirt depending from the cover and separate from the wall of the cup and spaced laterally outward of said ball valve, said skirt serving to prevent complete displacement of the ball valve from the tubular outlet, and means located on the exterior of the cup and operably connected to the outer end of said actuating member for moving the lower end of the actuating member into contact with the ball valve to displace the same from said tubular outlet.

7. The structure of claim 6 in which the radius of the ball valve is greater than the distance from the outer edge of the tubular outlet to the skirt.

8. In an automatic shut-off apparatus for a milking system, a closed cup having an inlet opening connected to an animal's teat and having an outlet opening spaced above the bottom of the cup and connected to a source of vacuum, a valve to open and close the outlet opening, a resilient plug secured in sealed relation within an aperture in the wall of the cup, an actuating member extending through the plug and sealed thereto, the inner end of said actuating member being disposed in spaced relation to the valve and adapted to selectively engage the valve and open the outlet opening, an operating mechanism connected to the outer end of said actuating member, said operating mechanism including a flexible member disposed to flex in a direction generally normal to the plane of the cover, and means for flexing said flexible member to thereby pivot the actuating member in said resilient plug and move the lower end of the actuating member into engagement with the valve to thereby displace the valve from the outlet opening.

9. In an automatic shut-off apparatus for a milking system, a closed cup having an inlet opening connected to an animal's teat and having an outlet opening spaced above the bottom of the cup and connected to a source of vacuum, a container, a lid for the container, a series of closed cups mounted on the lid with each cup having an outlet opening communicating with the container and having an inlet opening connected to an animal's teat, a valve disposed in each cup to open and close the outlet opening in the cup, a pin pivotally mounted in sealed relation in an aperture in the top wall of each cup and being selectively engageable with the respective valve to open the valve and establish a vacuum to the animal's teat and start the flow of milk, a post extending upwardly from the lid, a flexible connecting member slidably disposed on the post, said connecting member being operably connected to the upper ends of the pins and disposed to flex in a direction generally normal to the plane of the lid, and an operating member connected to the flexible connecting member for moving the flexible member axially on said post to thereby flex said connecting member and pivot the pins to thereby simultaneously displace said valves from the outlet opening.

10. The structure of claim 9 and including means for locking said flexible connecting member in the flexed position to thereby maintain said valves in the displaced position.

11. In a milking apparatus, a container having an open end, a lid enclosing the open end of the container with said lid including a lower lid plate and an upper lid plate with the central portion of the upper lid plate being spaced from the lower lid plate to provide a chamber therebetween, said lower lid plate having a milk outlet hole in the lower portion thereof communicating with the container, a cup mounted within the chamber and having an inlet opening connected to an animal's teat and an outlet opening communicating with the outlet hole in the lower lid plate, said upper lid plate being secured to the upper edge portion of the cup and the peripheral margin of said upper lid plate being secured to the lower lid plate, said milk inlet opening in the cup being located in said chamber between the upper lid plate and the lower lid plate, and a nipple secured to the wall of the cup and communicating with the milk inlet opening and extending through an opening in the upper lid plate and secured to said upper lid plate to thereby provide a strong rigid connection of said nipple to the lid.

12. The apparatus of claim 11, in which the lower lid plate includes a downwardly extending peripheral flange and said apparatus includes a stand to support the apparatus in periods of non-use, said stand including a ring-like member disposed within the flange on the lower lid plate, and said stand having a connecting member connecting the ring-like member within the flange and serving to secure the bowl to the depression in said lower lid plate.

13. In a milking apparatus, a container having an open end, a lid enclosing the open end of the container with said lid including a lower lid plate and an upper lid plate with the central portion of the upper lid plate being spaced from the lower lid plate to provide a chamber therebetween, said lower lid plate having a downwardly extending well and having a plurality of milk outlet holes in the well communicating with the container, a plurality of cups supported by the well with each cup having a milk inlet opening and a milk outlet opening communicating with an outlet hole in the well, said upper lid plate being secured to the upper edge portions of said cups and sloping downwardly therefrom with the outer margin of said upper lid plate being secured to said lower lid plate, an inlet nipple for each cup and secured to the wall of the cup and communicating with the milk inlet opening, each nipple extending upwardly through an opening in the upper lid plate and being secured to the upper lid plate to provide a strong connection of said nipples to said lid.

14. In a milking apparatus, a lid including a lower lid plate and an upper lid plate and a portion of the upper lid plate spaced above the lower lid plate to provide a chamber therebetween, said lower lid plate having a central depression, a plurality of cups mounted within said depression with the upper edge of the cups extending upwardly beyond the upper surface of said lower lid plate, said depression having a plurality of milk outlet holes therein, each of said cups having a milk inlet opening disposed between the upper lid plate and the lower lid plate and having a milk outlet opening in the lower portion thereof, said upper lid plate secured to the upper edge of each cup and sloping downwardly therefrom with the outer edge portion of the upper lid plate being secured to the lower lid plate, and a nipple secured to the wall of each cup and communicating with the milk inlet opening in the cup and extending upwardly through an opening in the sloping portion of the upper lid plate and secured to the upper lid plate.

References Cited by the Examiner

UNITED STATES PATENTS

| 1,656,124 | 1/28 | Mellotte | 137—198 |
| 2,581,530 | 1/52 | Harstick | 119—14.46 |
| 2,613,637 | 10/52 | Crawford | 119—14.46 |
| 2,685,862 | 8/54 | Hill et al. | 119—14.08 |
| 2,735,399 | 2/56 | Henrard | 119—14.46 |
| 2,777,420 | 1/57 | Schilling | 119—14.39 |
| 2,836,148 | 5/58 | Eades | 119—14.43 |
| 2,887,986 | 5/59 | Golemon | 119—14.43 |
| 3,092,074 | 6/63 | Johnson | 119—14.08 |

FOREIGN PATENTS 109,446  12/39  Australia.

SAMUEL KOREN, *Primary Examiner.*

ALDRICH F. MEDBERY, *Examiner.*